US010737652B1

(12) United States Patent
Piper et al.

(10) Patent No.: US 10,737,652 B1
(45) Date of Patent: Aug. 11, 2020

(54) CRASH SENSING USING CAVITY PRESSURE

(71) Applicant: Zoox, Inc., Menlo Park, CA (US)

(72) Inventors: Andrew John Piper, Palo Alto, CA (US); Josh Alexander Jimenez, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 19 days.

(21) Appl. No.: 15/693,090

(22) Filed: Aug. 31, 2017

(51) Int. Cl.
B60R 21/0136 (2006.01)
G01L 17/00 (2006.01)
B60R 21/0132 (2006.01)

(52) U.S. Cl.
CPC ...... B60R 21/0136 (2013.01); B60R 21/0132 (2013.01); B60R 2021/01322 (2013.01); B60W 2530/20 (2013.01); G01L 17/00 (2013.01)

(58) Field of Classification Search
CPC ...... B60R 2021/01322; B60R 21/0136; B60R 21/0132; G01L 17/00
USPC .......................................................... 701/45
See application file for complete search history.

(56) References Cited

U.S. PATENT DOCUMENTS

| 9,802,568 | B1 | 10/2017 | Larner | |
|---|---|---|---|---|
| 2011/0121994 | A1* | 5/2011 | Pampus | B62D 15/027 340/932.2 |
| 2014/0222306 | A1* | 8/2014 | Wanami | B60K 28/14 701/70 |
| 2015/0232091 | A1* | 8/2015 | Lich | B60W 30/09 701/41 |
| 2015/0321634 | A1* | 11/2015 | John | B60R 21/0136 701/45 |
| 2018/0197409 | A1* | 7/2018 | Youm | G07C 5/085 |
| 2019/0168549 | A1* | 6/2019 | Kanbayashi | B60C 23/04 |

* cited by examiner

Primary Examiner — Krishnan Ramesh
(74) Attorney, Agent, or Firm — Lee & Hayes, P.C.

(57) ABSTRACT

A safety system in a vehicle may be activated by receiving information indicating a physical change, such as a pressure, of an interval cavity associated with a tire or tire guard. The safety system may be activated based at least in part on the physical change (e.g. an increase in a pressure by at least a threshold amount, an increase of a pressure to a threshold pressure, or a rate of change of a pressure), in addition to other, external, information.

20 Claims, 5 Drawing Sheets

CRASH SENSING USING CAVITY PRESSURE

BACKGROUND

Passenger safety is of the utmost importance in transport vehicles. Effectiveness of the system is often predicated on accurate identification of a crash event and timely deployment of the safety system. In many conventional systems designed to mitigate the effects of a crash, accelerometers and/or other sensors are placed at the front of a vehicle. For example, sensors may be placed behind the grill in a conventional automobile. These sensors may detect a sudden change in acceleration or other movement of the vehicle, such as caused by striking an object head-on, and the sensed condition may then be used to deploy the safety system, e.g., by inflating an airbag. However, conventional systems of this type are often optimized for head-on impact. They do not perform as well for oblique impacts, for example, because of a delay in the impact occurring at a lateral distance from the up-front sensor.

BRIEF DESCRIPTION OF THE DRAWINGS

The detailed description is described with reference to the accompanying figures. In the figures, the left-most digit of a reference number identifies the figure in which the reference number first appears. The same reference numbers in different figures indicate similar or identical items.

DETAILED DESCRIPTION

Figure 1:
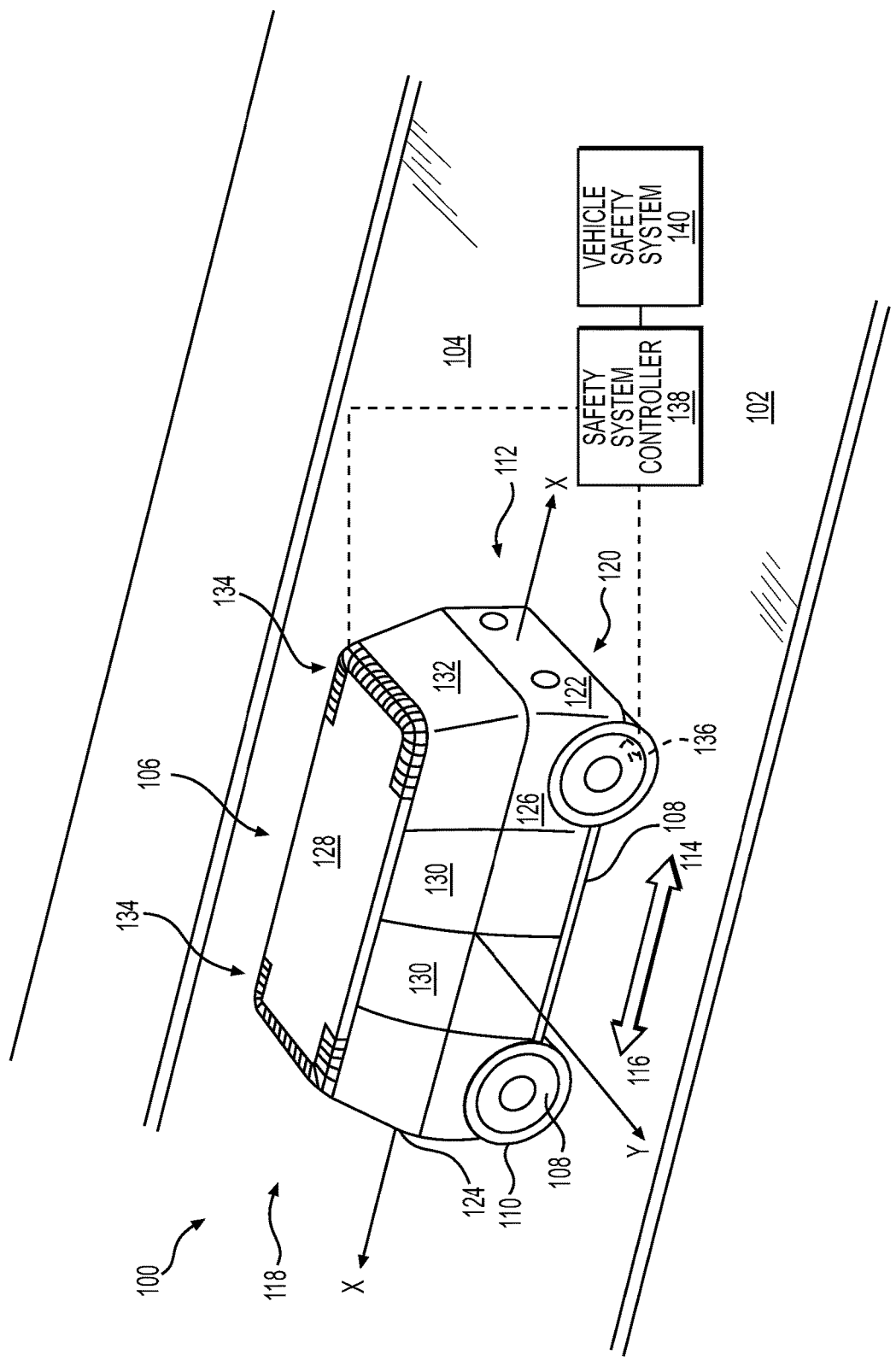
FIG. 1 is a perspective view of an example of an autonomous vehicle system according to some examples of the present disclosure.

Example vehicles, such as example autonomous vehicles, may include one or more tires configured to carry a vehicle body on a surface, such as a roadway. Each of the tires may define an internal cavity, with each internal cavity containing a volume of compressed air, for example. According to some examples, the vehicle may also include one or more sensors, each situated to sense a pressure in a respective internal cavity. The vehicle may also include a safety system and a safety system controller. The safety system controller may be configured to receive information from the sensor(s) and control the safety system according to the information received from the sensor(s).

In one non-limiting example, a vehicle may include four tires proximate four corners of the vehicle, two leading tires and two trailing tires. In this example, four sensors are provided, one associated with each of the tires, and each of the sensors senses an internal tire pressure of the associated tire. Information about the sensed tire pressures may be transmitted to a controller disposed on the vehicle, and the information may be used by the controller to control inflation of an airbag. For instance, when the sensor associated with one of the leading tires detects a sudden increase in pressure, the controller may determine that the increase in pressure is the result of a collision, and deploy the air bag. Thus, according to this example, impact at a tire may result in deployment of the airbag more quickly than in a conventional arrangement, in which the collision must register at sensors centrally-disposed and/or disposed longitudinally closer to the center of passengers in the vehicle.

In another example embodiment, a vehicle may include tires proximate leading and trailing surfaces of the vehicle. The tires may include a cavity, e.g., the compressed interior, and/or separate cavities may be associated with the tires. For instance, a tire guard or other feature may be disposed proximate each of the tires, and the tire guard may include a hollow cavity disposed therein. In this example, sensors may be associated with the tire cavities and/or with the tire guard cavities. As in the example described above, information about the tire cavities and/or the tire guard cavities, e.g., information indicative of a sudden increase in pressure, may be used to determine that a safety system should be activated.

In other example implementations, information additional to the pressure information may be used to determine whether a safety system should be activated. For example, information about an environment of the vehicle, e.g., objects in the environment, and/or information about the vehicle, e.g., speed or acceleration information, may be used. The additional information may be used to confirm that a safety system should be activated, e.g., by confirming that a struck object is sufficiently large, the vehicle is travelling above a threshold speed, or the like. In other implementations, the additional information may be used to determine that a safety system should not be activated, e.g., because the sensed pressure change was the result of striking an object that was below a threshold size or was a pothole, the vehicle was travelling relatively slowly, or the like.

The techniques, assemblies, and systems described herein may be implemented in a number of ways. Example implementations are provided below with reference to the following figures.

FIG. 1 illustrates an example of an autonomous vehicle system 100 configured to travel on a surface 102 (e.g., a road surface) in an environment 104, for example, to transport people and/or cargo. For the purpose of illustration, the system 100 can comprise a vehicle 106, which may be an autonomous vehicle configured to operate according to a Level 5 classification. The Level 5 classification was issued in 2016 by the U.S. National Highway Traffic Safety Administration, and describes a vehicle capable of performing all safety-critical functions for the entire trip, with the driver (or occupant) not being expected to control the vehicle at any time. In that case, since the vehicle may be configured to control all functions from start to stop, including all parking functions, it may be unoccupied. This is merely an example, and the systems and methods described herein may be incorporated into any ground-borne vehicle, also including conventional automobiles in which all vehicular control is performed by a driver and vehicles that are partially autonomously controlled, such that they can be autonomously controlled without driver attention or assist during certain driving conditions, such as, for example, while operating on limited-access highways. Such partially autonomously controlled vehicle may require driver attention and/or assistance during other driving conditions, such as, for example, while operating on city streets in urban areas, or during at least some parking functions.

As further illustrated in FIG. 1, the vehicle 106 is transported by four wheels 108, each having a respective tire 110. The vehicle 106 may be powered by one or more internal combustion engines, one or more batteries and electric motors, hydrogen fuel cells, or any combination thereof (none of which are shown). In addition, although the example vehicle 106 has four wheels, the systems and methods described herein may be incorporated into vehicles having fewer or a greater number of wheels, tires, and/or tracks. The example vehicle 106 may have four-wheel steering and may operate generally with equal performance characteristics in all directions. The vehicle may be bi-directional, i.e., capable of travelling forward in either of two opposite directions. For example, in the illustrated embodiment, a first end 112 of the vehicle 106 is the front or leading end of the vehicle 106 when the vehicle 106 is traveling in a first direction 114, and the first end 112 is the rear or trailing end of the vehicle 106 when the vehicle 106 is traveling in the opposite, second direction 116. Similarly, a second end 118 of the vehicle 106 is the front or leading end of the vehicle 106 when the vehicle 106 is traveling in the second direction 116, and the second end 118 is the rear or trailing end of the vehicle 106 when the vehicle 106 is traveling in the first direction 114. These example characteristics may facilitate greater maneuverability, for example, in small spaces or crowded environments, such as parking lots and urban areas.

The vehicle 106 also has a body 120, generally defining an exterior of the vehicle. For example, the body may define a type or configuration of the vehicle, such as a van, automobile, sport utility vehicle, crossover vehicle, truck, bus, agricultural vehicle, or construction vehicle. As used herein, the term "body" generally refers to any and all external, i.e., disposed in the environment 104 components of the vehicle 106, carried by the wheels 108. The body may be disposed on or more generally include a frame or one or more additional support structures (not shown), as is conventionally known. In the example vehicle 106, the body 120 generally includes a first end surface 122 and an opposite, second end surface 124. The first end surface 122 and the second end surface 124 are generally arranged at the first and second ends 112, 118, separated along a longitudinal axis X by a vehicle length. The body 120 also includes lateral sides 126 (one of which is shown) extending between the end surfaces and separated along a lateral axis Y by a vehicle width. As also illustrated, the body 120 may also include a roof 128, generally defining a top of the vehicle 106 and extending between the first end surface 122, the second end surface 124, and the lateral sides 126. The body 120 may further include one or more doors 130, e.g., on one or both of the sides 126 for facilitating ingress and egress to and from an interior space of the vehicle 106. The vehicle 106 may also include a windshield 132 and/or other windows. In some examples, the vehicle 106 may not include windows, however. For example, because the vehicle 106 may be a Level 5 autonomous vehicle, a windshield may not be necessary.

In the example shown in FIG. 1, the system 100 may also include one or more sensor arrays, generally represented by reference numeral 134. The sensor arrays 134 may include one or more imagers, RADAR sensors, and/or LIDAR sensors mounted on the vehicle 106. Imagers and sensors associated with the sensor arrays 134 may be arranged in a predetermined pattern, for example, in order to provide a desired area of coverage of the environment 104 proximate the vehicle 106, including, for example, the road surface 102. The arrays 134 can be disposed in a pattern that enables approximately 360-degree sensing around the vehicle 106. This may enable the vehicle 106 to detect objects regardless of the direction of travel of the vehicle. This may also enable the system 100 to detect objects approaching from the lateral sides of the vehicle 106 (e.g., a dog, or other animal, running into the street). Other patterns and arrangements of the sensors arrays also are contemplated.

As noted above, the sensor arrays may include imagers, which may be any known types of digital image sensors, digital or analog cameras, and/or digital or analog video cameras. The imagers may be high dynamic range (HDR) cameras, for example, to provide improved accuracy of the images. In some examples, the imagers may include one or more of light-sensitive cameras, range sensors, tomography devices, RADAR, and/or ultra-sonic cameras. Other suitable types of imagers are contemplated. The imagers may be selected to provide two-dimensional (2-D) image data, two and a half-dimensional (2.5d, or depth maps), and/or three-dimensional (3D) image data, image sequences, gray image data, and/or color image data. In some examples, the imagers may be selected to provide depth data, absorption data, and/or reflectance data.

As also shown in FIG. 1, the example sensor arrays 134 may be mounted to a portion of the vehicle 106 that provides a line-of-site view of a portion of the environment 104, with at least a portion of the sensors making up the array 134 being pointed in the direction of travel. As shown, each example sensor array 134 can be mounted to a portion of the roof 128. As shown in FIG. 1, in some examples, one or more of the sensors may be arranged laterally along the upper edge of the windshield 132, and may be aimed substantially aligned with and/or substantially transverse to the longitudinal axis X of the vehicle 106. In any of the examples described herein, the longitudinal axis X may be defined by and/or may pass substantially centrally through the frame, body, other components of the vehicle 106, and/or the vehicle 106, generally.

As will be understood from the foregoing, the vehicle 106 may be configured to drive autonomously, semi-autonomously, or manually on the surface 102. In some implementations, the sensor arrays 134 may help to navigate the vehicle 106, e.g., to obey traffic laws, avoid obstacles, etc. However, as the vehicle 106 traverses the environment 104, there may be instances in which the vehicle 106 may impact an object in its surrounding environment.

As illustrated in FIG. 1, a pressure sensor 136 is associated with one of the wheels 108. Although only a single pressure sensor 136 is illustrated, more pressure sensors may also be provided. For example, a pressure sensor 136 may be associated with each wheel 108. As will be described in more detail below, the pressure sensor 136 may be disposed to sense a pressure of the associated tire, i.e., the pressure sensor 136 may be a tire pressure monitoring sensor. In other embodiments, the pressure sensor 136 may be disposed to sense a pressure of a cavity associated with the respective wheel 108. Though depicted as a pressure sensor 136 for illustrative purposes, other sensors are contemplated which may determine a change in volume based on other physical properties of the tire. As a non-limiting example, a temperature sensor may be used to infer a volume change based on the ideal gas law.

As also illustrated, the pressure sensor 136 is communicatively coupled to a safety system controller 138, and the safety system controller 138 is communicatively coupled to a vehicle safety system 140. As described in more detail below, the safety system controller 138 may receive information from the pressure sensor(s) 136 and, based on the information, cause the vehicle safety system 140 to take some action, e.g., deploy an airbag or tighten a restraint. Additional details of the improved crash sensing system useful in vehicles, including the vehicle 106 will now be described with reference to the remaining figures.

Figure 2B:
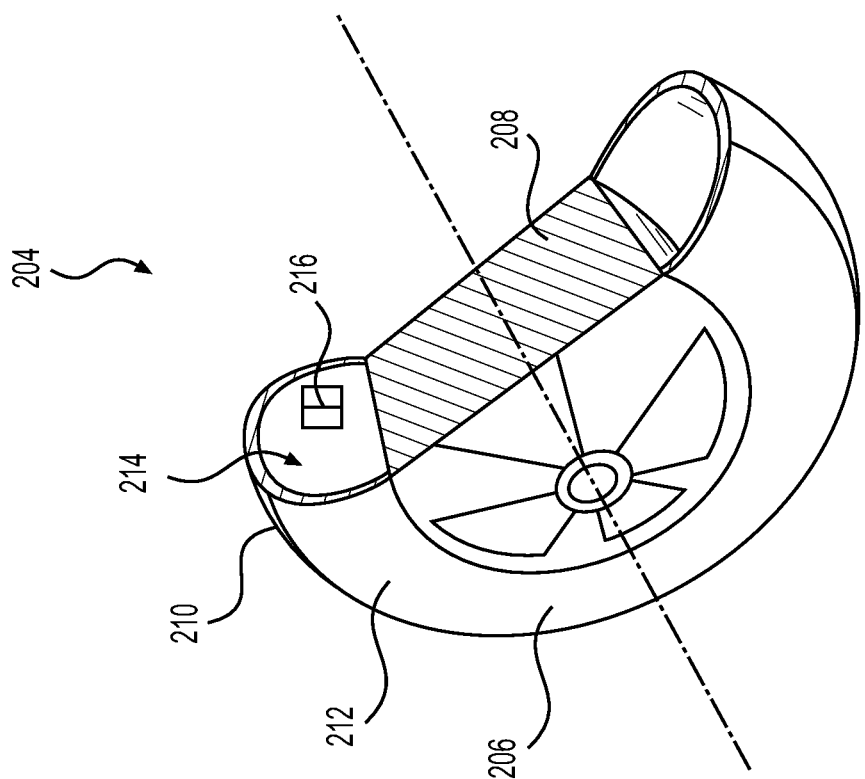
FIG. 2B is a cut-away view of a wheel of the autonomous vehicle system shown in FIG. 2A.
Figure 2A:
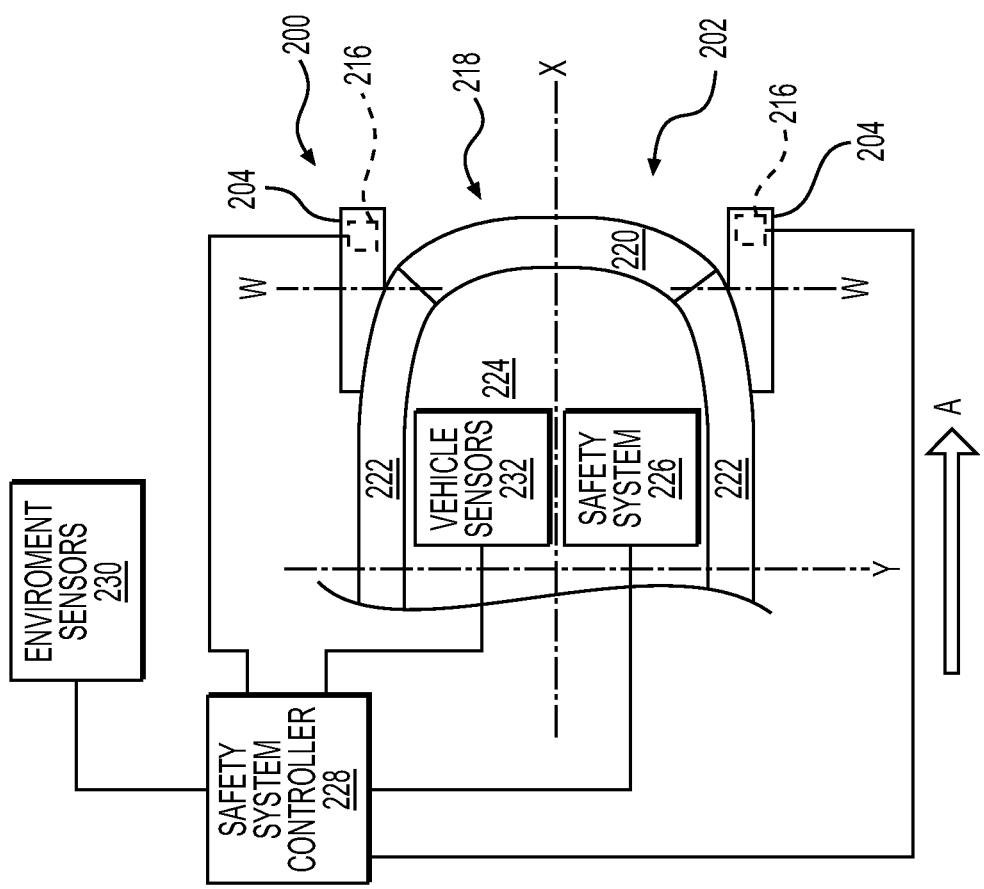
FIG. 2A is a partial top plan view of the autonomous vehicle system shown in FIG. 1, according to an example embodiment of the present disclosure.

FIG. 2A is a schematic representation of an autonomous vehicle system 200 with improved crash sensing according to an implementation of this disclosure. As illustrated, the system 200 includes a vehicle 202. For clarity, only a longitudinal end of the vehicle 202 is illustrated. The vehicle 202 may have many of the same features as the vehicle 106, or may have different features altogether. As illustrated, the vehicle 202 includes wheels 204 disposed to traverse on a surface, such as a roadway (not shown). In the illustrated embodiment, the vehicle 202 is travelling in a direction A, generally parallel to a longitudinal axis X of the vehicle and perpendicular to a lateral axis Y of the vehicle 202. Accordingly, the wheels 204 are front or leading tires and the portion of the vehicle 202 illustrated may be considered a front or leading end of the vehicle 202. The portion of the vehicle 202 not illustrated in FIG. 2A may be identical in construction to the illustrated end, that is, the vehicle may be substantially symmetrical about the lateral axis Y, as in the bi-directional autonomous vehicle 106. In other implementations, the omitted end may be different from the illustrated end. For example, because the illustrated end is a front or leading end of the vehicle 202, the omitted end may more closely approximate a rear end of a conventional vehicle.

As best shown in the cut-away perspective view of FIG. 2B, each of the wheels 204 generally includes a tire 206 disposed on a hub 208 and configured to rotate about a wheel axis W. The tire 206 includes a tread 210, which contacts the road surface and sidewalls 212. The tread 210 and the sidewalls 212 generally define an internal cavity 214. In the schematic illustration of FIG. 2B, the cavity 214 is bounded directly by the tread 210 and the sidewalls 212, although in other implementations a tube or other bladder may be disposed in an opening defined by the tread 210, the sidewall 212, and the hub 208, with the tube providing the internal cavity 214. In implementations of this disclosure, the internal cavity 214 is pressurized, and a pressure sensor 216 is disposed to sense the pressure in the cavity 214. Although FIG. 2B illustrates the pressure sensor 216 disposed entirely in the cavity 214, in other implementations only a portion of the sensor may be disposed in the cavity, for example, with a remainder of the pressure sensor 216 disposed outside the cavity, e.g., between an inner tube and one of the sidewalls 212. In some implementations, the pressure sensor 216 may be part of a conventional tire pressure monitoring system, disposed to sense a pressure of the tire. In conventional systems, the tire pressure monitoring system may be used to alert a driver to low pressure in a tire and/or relay tire pressure values to the driver.

As best illustrated in FIG. 2A, the vehicle 202 also includes a body 218, which may be the body 120 described above with reference to the vehicle 106. The body 218 generally defines one or more outer surfaces of the vehicle 202, and may include a leading surface 220, lateral sides 222, and a roof 224. More or fewer body sections may also be included. For example, the body 218 may also include one or more of a windshield, door panels, bumpers, or the like. Generally, the body 218 includes the exterior surfaces of the vehicle 202. Portions of the body may be fixed to a frame, for example.

In the embodiment of FIGS. 2A and 2B, two leading wheels are illustrated, generally at the leading corners of the vehicle 202. Moreover, the wheels may be disposed at least partially outside the body 218 of the vehicle 202. For example, in the illustrated embodiment, the wheels 204 extend, in a longitudinal direction, further from the lateral axis Y than the leading surface 220 of the vehicle 202. Moreover, the wheels 204 are disposed to extend, in a lateral direction, further from the longitudinal axis X than the respective sides 222 of the vehicle 202. In conventional parlance, the arrangement of the wheels 204 may constitute an "open-wheel" design or produce a "negative overhang" of the body relative to the wheels. Although the illustrated embodiment illustrates the wheels extending relative to the body in both the lateral direction and the longitudinal direction, the wheels may extend in only the lateral direction or only the longitudinal direction. Moreover, as will be appreciated to a person having ordinary skill in the art with the benefit of this specification, aspects of the disclosure may be useful in arrangements in which the wheels do not extend relative to the body in either the lateral direction or the longitudinal direction.

As further illustrated schematically in FIG. 2A, the system 200 also includes a safety system controller 228 communicatively coupled to the pressure sensors 216. The safety system controller 228 may be similar to the safety system controller 138 described above, and may be disposed to receive pressure-related information from each of the pressure sensors 216. The pressure-related information may be information about a pressure in the internal cavity 214 of the associated tire 206. For instance, the pressure-related information may be an actual pressure sensed by the sensor, a rate of pressure change, or may include information indicating a threshold change in the pressure or in the rate of pressure change of the internal cavity 214 of the associated tire 206, e.g., over a specific timeframe. In some implementations, each of the sensors 216 may have an associated transmitter that wirelessly transmits information about the pressure to the safety system controller 228. In other implementations, the sensors 216 may provide the pressure-related information to the safety system controller 228 through a direct connection, e.g., wiring.

The safety system controller 228 may be implemented as or include one or more computers, rack systems, processors, kernels, or other control devices disposed on the vehicle 202. Alternatively, the controller 228 may comprise one or more computers or other computing devices disposed remote from the vehicle 202 and connected to components of the autonomous vehicle system 200 via one or more wireless networks. In any of the examples described herein, the controller 228 may include and/or may be connected to memory including computer readable media. Computer readable media may include volatile and non-volatile, removable and non-removable media implemented in any method or technology for storage of information such as computer readable instructions, data structures, program modules, or other data. As defined herein, computer readable media does not include communication media in the form of modulated data signals, such as carrier waves, or other transmission mechanisms.

The safety system controller 228 is illustrated as being operably connected to a safety system 226, e.g., in order to control operation of the safety system 226. The safety system 226 may be the vehicle safety system 140, and generally includes any vehicular impact-mitigation system. By way of non-limiting example, the vehicle safety system 140 may include an internal safety system, e.g., designed to directly interact with passengers and/or cargo carried by the vehicle, and/or an external safety system, which may be designed to deploy or otherwise activate outside the vehicle to protect the vehicle and/or the passengers/cargo in the vehicle. Internal safety system may include, for example, one or more airbags, air curtains, restraint systems, seat belt systems, seatbelt tensioning systems, or the like. External safety systems may include external bladders, active bumper devices, or the like. In still other implementations, the vehicle safety system 226 may including a handling system that controls one or more vehicular functions, including but not limited to steering, braking, acceleration, or the like.

Although the safety system controller is 228 is illustrated as being operably connected to the safety system 226, the disclosure is not limited to this arrangement. For instance, in other implementations, the safety system controller 228 and the safety system 226 may be integrated into a single unit, with the unit performing the functionalities ascribed herein to the separate components. Similarly, functionality described herein as being associated with the safety system controller 228 and/or the safety system 226 may be performed by still other or additional components.

In implementations of the disclosure, the safety system controller 228 uses the pressure-related information received from one or more of the sensors 216 to control the safety system 226. For example, and as will be described in more detail below with reference to FIGS. 3A-3C and 5, the safety system controller 228 may deploy one or more safety systems 226 in response to determining that a pressure of one of the tires has increased in a manner consist with the wheel colliding with an object.

In making the determination that a crash has occurred that requires activating the safety system 226, the safety system controller 228 may also consider information from other sources. For example, the safety system controller 228 may also receive information from one or more environmental sensors 230 and/or one or more vehicle sensors 232. The environmental sensors 230 generally are disposed to sense aspects of the environment in which the vehicle 202 is traversing. By way of non-limiting example, the environmental sensors 232 may detect attributes of the environment, e.g., temperature, humidity, and the like, and/or of objects in the environment, e.g., objects on or proximate the road, road conditions, and the like. The vehicle sensors 232 may detect attributes of the vehicle, for example, a speed of the vehicle, a rate of change of the speed of the vehicle, the vehicle's occupancy, an acceleration of the vehicle, a rate of change of the acceleration of the vehicle, and the like. The vehicle sensors 232 may also include conventional crash-detecting sensors, such as the type used in conventional air bag systems to determine whether deployment of an airbag is appropriate. In other embodiments, the vehicle sensors 232 may include sensors that determine movement of aspects of the vehicle. For example, the vehicle sensors 232 may determine suspension deflection parameters. An object strike accompanied with an upward suspension deflection, for example, may suggest that a small object or a pothole has been struck, as opposed to a vehicle or wall. In some implementations, the environmental sensors 230 and/or the vehicle sensors 232 may include aspects and/or features of the sensor arrays 134 discussed above with reference to FIG. 1.

As understood, FIGS. 2A and 2B describe a system in which information about a pressure in an internal cavity of a tire may be used to activate the safety system 226 in the vehicle 202. In conventional systems, sensors including accelerometers may be placed proximate the front of a vehicle, generally along the longitudinal axis X. When the front of a vehicle collides with an object, e.g., in a head-on collision, the accelerometers sense a drastic change in acceleration, and an airbag is deployed. However, not all accidents involve head-on collisions. Because of the location of the conventional sensing systems, deployment of an airbag can be delayed in oblique crashes, e.g., crashes at the front corners of the vehicle. Moreover, in instances in which the wheels extend beyond the body, the wheels may be the first point of impact. The present disclosure describes improvements to safety systems that may result in improved sensing of crashes, which may mean increased safety for passengers in the vehicle.

Figure 3A:
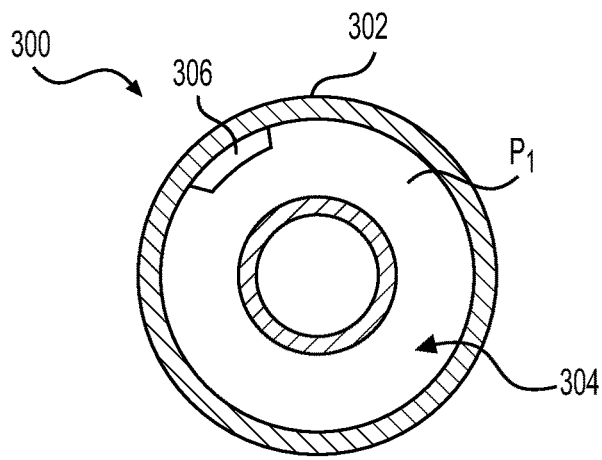
FIG. 3A is a cut-away elevation view of a wheel, such as the wheel illustrated in FIG. 2B, during normal operation.
Figure 3B:
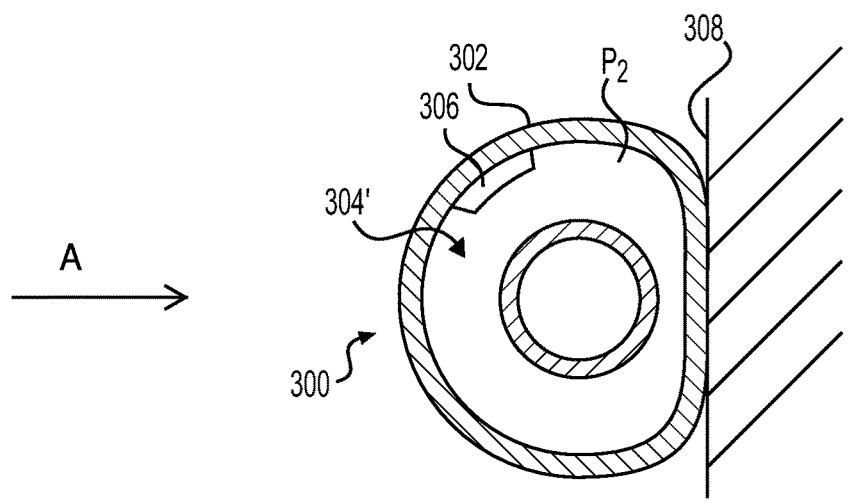
FIG. 3B is a cut-away elevation view of a wheel, such as the wheel illustrated in FIG. 2B, striking an object.
Figure 3C:
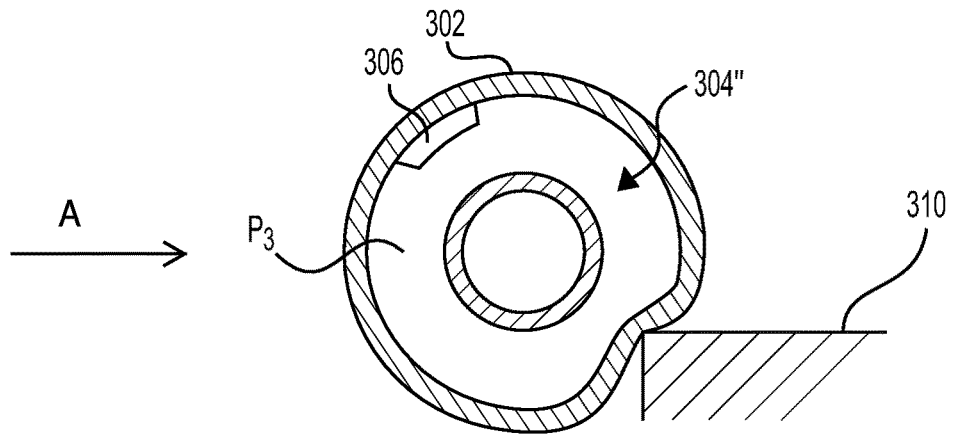
FIG. 3C is a cut-away elevation view of a wheel, such as the wheel illustrated in FIG. 2B, striking an object.

FIGS. 3A-3C are cross-sectional views of a tire 300, like the tires 206 discussed above. The tire 300 generally includes a tread 302 and an inner cavity 304. As discussed above, the inner cavity may be formed by the tread 302 and sidewalls (not shown) of the tire 300 or may be defined by an inner tube or other bladder (not shown) disposed in the tire 300. A sensor 306 is disposed to sense a pressure in the cavity 304. Although the sensor 306 is illustrated as being disposed in the cavity 304, only a portion of the sensor 306 may be disposed in the cavity 304. For instance, the sensor may be integrated into a valve stem of an inner tube, as in some conventional tire pressure monitoring systems. In FIG. 3A, the tire 300 is in a normal operating condition, with an internal pressure of $P_1$. In some examples, the sensor 306 may not be in direct contact with the cavity 304 at all. As a non-limiting example, the sensor 306 may be located along a sidewall of the tire 300 to measure stress, strain, or other deformations which may be used to determine a pressure or volume of the cavity 304. In some examples, the sensor 306 may be a temperature sensor (as noted above) and be located along the sidewall or within the cavity 304 of the tire 300 so as to determine pressure or volume 304 of the cavity indirectly.

FIG. 3B shows the result of a collision of the tire 300 with an obstacle 308. The obstacle 308 may be any object that the tire 300 (and thus the vehicle) may impact. In more detail, as the tread 302 contacts the object 308, the tire deforms. Because of the deformation, the inner cavity 304' is deformed, and a pressure in the tire increases to increased pressure $P_2$. The sensor 306 senses the increased pressure $P_2$ and may relay information about the increased pressure to a controller, such as the safety system controller 228, to take some safety action, e.g., deploy an airbag.

FIG. 3C shows the result of another type of collision of the tire 300. In this instance, the tread 302 of the tire 300 has impacted an object 310, again causing the tire 300 to deform. The deformation causes the inner cavity 304" to compress, increasing the pressure in the tire to a pressure $P_3$. In the schematic illustration, the object 310 is shorter than the object 308, and may approximate a curb, speed bump, edge of a pot hole, or other relatively short obstruction.

In some embodiments, information about the increased pressure $P_2$, $P_3$ may be sufficient to trigger the safety system. However, other information may also be used to make that determination, e.g., to avoid activating a safety system in instances in which such is not required. For instance, attributes of the object 308, 310 may be a factor in deploying the safety system. For example, if the object 308 is another vehicle, it may be desirable to activate the safety system, whereas when the object 310 is a curb, deploying an airbag may be unnecessary. Attributes of the objects 308, 310 may be determined using environmental sensors, such as the environmental sensors 230 discussed above with reference to FIG. 2A. Other information may also be useful to the safety system controller when determining whether to activate a safety system. For example, information about the speed of the vehicle may also be used by the safety system controller to determine whether to activate the safety system. For instance, if the vehicle is going sufficiently slowly, but nonetheless impacts an object that causes a sudden increase in tire pressure to the increased pressure $P_2$, it may not be desirable to deploy the safety system. In additional implementations, object identification and/or attributes (measured or predicted) of the object may be used in tandem with the speed of the vehicle. For example, impacting another vehicle at a first, relatively slower speed may cause activation of the safety system, whereas impacting a curb may result in activation of the safety system only at a second, relatively faster speed. Moreover, instead of or in addition to using the speed of the vehicle, implementations of this disclosure may consider a speed of the vehicle relative to the object to be impacted. For instance, an impact at a high speed may not cause activation of the safety system if the speed of the vehicle relative to the object is lower than some threshold. This may be particularly useful when the object is a dynamic object.

Moreover, information from sensors about the presence/absence of passengers may also be used by the safety system controller to determine whether to activate the safety system. For instance, if there are no passengers in the vehicle, e.g., because the vehicle is parked or is traversing autonomously between locations without a passenger, and an impact occurs that causes the tire pressure to increase, it may not be desirable to activate the safety system.

Figure 4B:
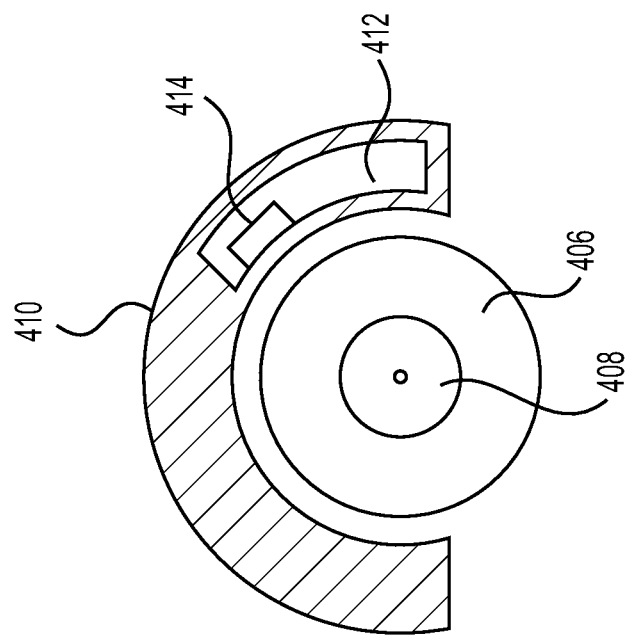
FIG. 4B is a cut-away view of a wheel and tire guard of the autonomous vehicle system shown in FIG. 4A.
Figure 4A:
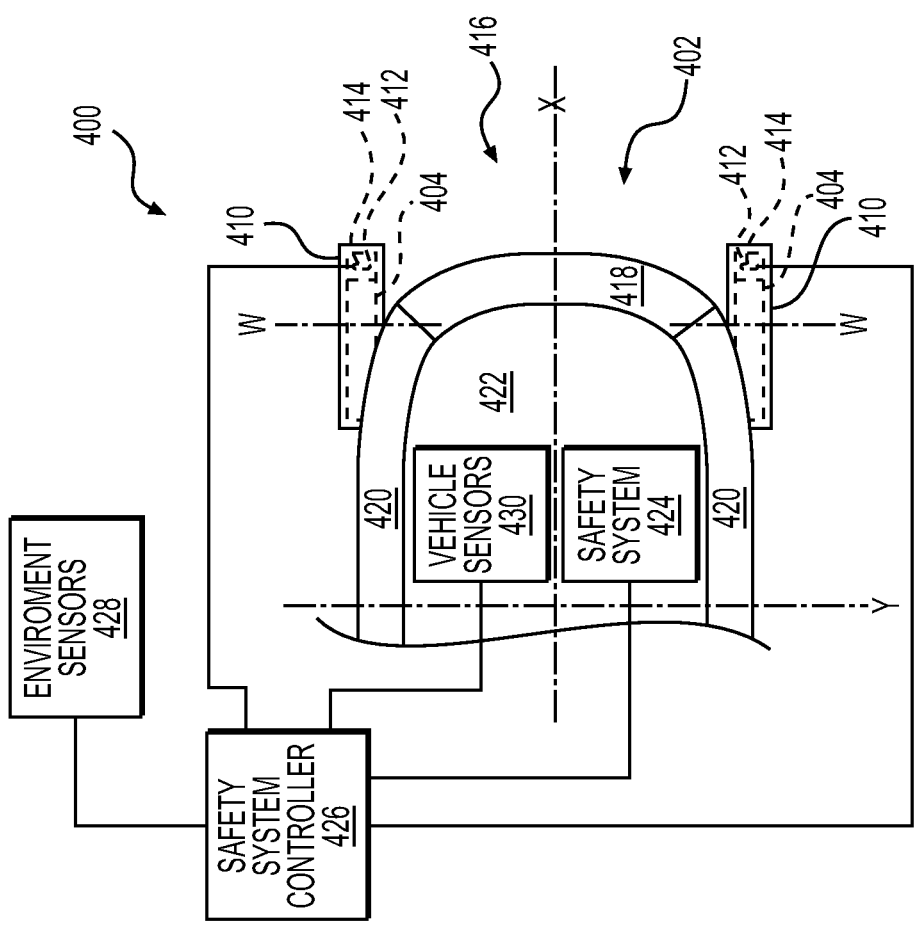
FIG. 4A is a partial top plan view of the autonomous vehicle system shown in FIG. 1, according to another example embodiment of the present disclosure.

FIGS. 4A and 4B illustrate another embodiment of this disclosure. Specifically, FIG. 4A illustrates an autonomous vehicle system 400 similar to the autonomous vehicle systems 100, 200 described above. The autonomous vehicle system 400 generally includes a vehicle 402 of which only a portion is shown. The vehicle 402 may have any of the features discussed above with reference to the vehicle 106 and/or vehicle 202. For instance, the vehicle 402 may be configured as a Level 5 autonomous vehicle, and may be bidirectional. For purposes of illustration, the vehicle 402 is traversing along a surface, e.g., a roadway, in a direction A (not shown). The direction A may be generally parallel to a longitudinal axis X of the vehicle 402, and be perpendicular to a lateral axis Y of the autonomous vehicle. As of the vehicle 202 described above, the vehicle may be generally symmetrical about the longitudinal axis X and lateral axis Y. In other implementations, the vehicle may be asymmetrical about one or both of those axes.

The vehicle 402 is configured to be moved along the surface via wheels 404. As generally illustrated in FIGS. 4A and 4B, each wheel 404 includes a tire 406 arranged on a hub 408 and disposed to rotate about a wheel axis W. Also in this embodiment, a wheel or tire guard 410 is disposed to cover at least a portion of the tire 406. In the embodiment of FIG. 2A discussed above, the tire 206 is exposed. In this embodiment, however, the tire guard may be provided to prevent contact of foreign objects with the tire 406, or of the tire 406 with foreign objects. The tire guard 406 generally is illustrated as extending over and along approximately 240-degrees of the tire 406, e.g., 120-degrees in front of and behind each of a vertical plane bisecting the tire 406 at the wheel axis W, with the bottom of the tire 406 being exposed to contact the surface. However, the tire guard 410 may extend over more or less of the tire 406, and the tire guard 410 need not be symmetrical about the vertical plane; FIG. 4B is only one example.

The tire guard 410 also includes an internal cavity 412, which is generally an enclosed space within the tire guard 410. In some embodiments, the internal cavity 412 may be disposed at least partially in front of the tire 406, relative to a direction of travel of the vehicle 402. In the example of FIG. 4A, as the vehicle travels in the direction A, at least a portion of the internal cavity 412 is located, in the longitudinal direction, further from the lateral axis than a leading edge of the tire 406. In the embodiment illustrated in FIG. 4B, the inner cavity 412 is disposed entirely in front of a vertical plane parallel to the lateral axis Y and extending through the wheel axis W of the wheel 404. In other embodiments, the inner cavity 412 may extend substantially entirely throughout the tire guard 410. For instance, portions of the inner cavity 412 may be disposed, in the lateral direction, beyond an external sidewall of the tire 406.

Pressure sensor 414 is disposed to monitor a pressure within the internal cavity 412. Although the pressure sensor 414 is illustrated as being disposed entirely within the cavity 412, such is not required. For example, portions of the pressure sensor 414 may be disposed outside the cavity 412. For example, at least a portion of the sensor 414 may be fixed to a surface of the tire guard 410. Operation of the pressure sensor 414 is similar to that of the tire pressure sensor 216, and additional details will be described in more detail below.

As of the vehicle 202 discussed above, the vehicle 402 also includes a body 416, which generally defines an outer surface of the vehicle 402. As illustrated, the body 416 generally includes a leading surface 418, opposite sides 420 and a roof 422. The body may include more or fewer portions, depending generally on design choice, and the illustrated portions are for example only. As with the embodiment shown in FIG. 2A, at least a portion of each of the wheels 404 may be disposed outside the footprint of the body 416, either in the lateral direction and/or in the longitudinal direction.

As illustrated schematically, the vehicle 402 also include a safety system 424. The safety system 424 may have any of the characteristics of the safety system 226, discussed above. For example, the safety system 424 may be an interior safety system, an exterior safety system, and/or a maneuvering system that controls one or more aspects of the vehicle 402.

The safety system 424 is communicatively coupled to, and controlled by, a safety system controller 426. The safety system controller 426 may include some or all characteristics of the safety system controller 228. Moreover, although the safety system controller 426 is illustrated as being separate from the vehicle 402, in some embodiments, some or all functionality of the safety system controller 426 may be performed remote from the vehicle 402, e.g., at a remote server associated with a dispatch or headquarters for the vehicle 402 or in the cloud. In other implementations, some or all of the functionality of the safety system controller 426 may be performed at the vehicle 402. For instance, it may be desirable to control the safety system 424 at the vehicle 402 to minimize any delay that could result from the transmission of data between locales.

As noted above with regard to FIG. 2, although the safety system controller 426 is illustrated as being operably connected to the safety system 424, the disclosure is not limited to this arrangement. For instance, in other implementations, the safety system controller 426 and the safety system 424 may be integrated into a single unit, with the unit performing the functionalities ascribed herein to the separate components. Similarly, functionality described herein as being associated with the safety system controller 426 and/or the safety system 424 may be performed by still other or additional components.

The safety system controller 426 may be configured to control the safety system 424 based on information received from the pressure sensors 414 associated with the cavities 412 in the tire guards 410. Information related to the pressure in the cavities 412 may be transmitted wirelessly to the safety system controller 426. However, one advantage of using the cavities 412 in the tire guards 410, instead of using tire pressure as in the example of FIGS. 2A and 2B, is that the pressure sensors may be more readily conducive to hard wiring to the safety system controller 426, i.e., because the cavities 412—and therefore the sensors 414—are stationary instead of rotating. Each of the sensors 414 may transmit the pressure of the associated cavity 412 to the controller 426 at regular intervals or as a substantially steady stream of information. In other embodiments, the sensors 414 may include associated logic or programming that transmits information, e.g., a signal, to the controller 426 only when the pressure exceeds a certain threshold pressure and/or the pressure has increased by a threshold amount and/or when a rate of change of the pressure sensed exceeds some threshold. The transmission of information to the controller 426 may also depend on a time associated with the increase in pressure. For example, the controller 426 may only receive information from one of the sensors 414 if the pressure of the associated cavity 412 increases by a threshold amount in a predetermined time.

The safety system controller 426 may also receive information from other types of sensors. For example, the safety system controller 426 may be communicatively coupled to one or more environmental sensors 428 and/or one or more vehicle sensors 430. The environmental sensors 428 may be disposed to sense conditions surrounding the vehicle 402 and the vehicle sensors may be disposed to sense conditions of the vehicle 402. By way of non-limiting example, the environmental sensors may detect the presence of objects in the environment of the vehicle and/or determine attributes of those objects. In some implementations, the environmental sensors 428 may not be disposed on the vehicle 402. For instance, the environmental sensors may be disposed in the environment, e.g., associated with fixtures along a street, or the environmental sensors may be associated with other vehicles in the environment. In one example implementation, the vehicle 402 may be associated with a fleet of vehicles, and information from other vehicles may be received at the safety system controller 426. In one non-limiting example, a first vehicle traversing a road before the vehicle 402 may detect a stick, pothole, or other relatively small obstruction on the road. Information about the obstruction from the first vehicle may be used by the vehicle 402 to determine whether to activate a safety system. The vehicle sensors 402 may detect vehicle speed, vehicle acceleration and/or other attributes of the vehicle 402.

The embodiment of FIGS. 4A and 4B may offer benefits and improvements similar to those discussed above with regard to FIGS. 2A, 2B and 3. For instance, by monitoring the pressure of the cavity 412 associated with the tire guard 410, impact involving the vehicle 402 may be detected earlier than in conventional systems. This may be particularly true for arrangements in which the wheels and/or tire guards extend beyond the footprint of the body 416 in at least one of the lateral or longitudinal direction. Implementations of this disclosure may also be useful for other body constructions, however. Even in a conventional, closed-wheel arrangement, using tire pressure sensor information to determine whether to activate a safety system may result in quicker deployment of the safety system, for example, in oblique crashes where the initial point of impact is proximate the wheel.

Modifications to the foregoing embodiments also are contemplated. For instance, while FIGS. 2A and 2B illustrate an embodiment in which tire pressure is detected and FIGS. 4A and 4B illustrate an embodiment in which pressure of a cavity in a tire guard is detected, alternative embodiments may use pressure from both. For instance, in the embodiment of FIGS. 4A and 4B, tire pressure sensors may be used in addition to the pressure sensors 414 associated with the tire guard. In still other implementations, only some of the wheels may include tire guards, with the tire pressure being used for those tires that do not include tire guards and/or at least one of the tire pressure and the cavity pressure may be used for tires that do include tire guards.

In other modifications, multiple cavities 412 may be provided in a single tire guard 410. For instance, cavities may be arranged at different longitudinal distances, and a sensor 414 may be associated with each cavity. According to this embodiment, the severity of a collision may be correlated to a number of cavities affected by the collision. For example, if the pressure associated with only a front-most cavity in the tire guard 410 is determined to be deformed, but other cavities experience no pressure change, the collision may not be sufficiently sever so as to activate a safety system.

In still other implementations, cavities may be provided in other or additional portions of the body. For example, the leading surfaces or side surfaces may include cavities and associated sensors for measuring pressure in those cavities. As in example embodiments described herein, the cavity pressure, e.g., a change in cavity pressure, may be used to detect collisions at other locations of the vehicle, including locations further spaced from the wheels.

Figure 5:
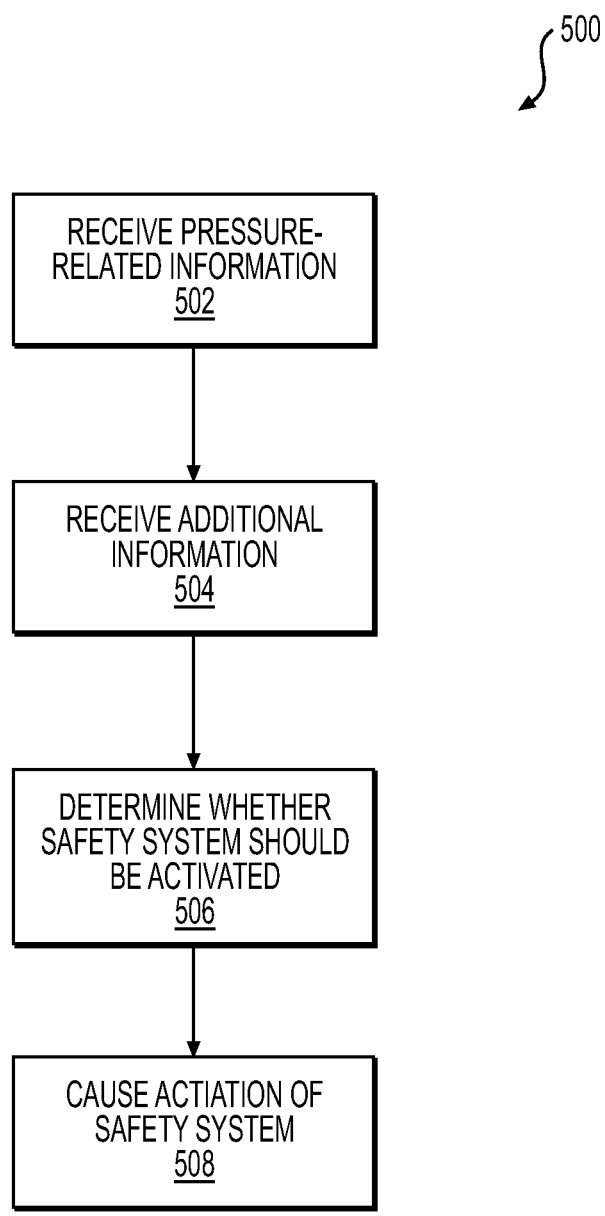
FIG. 5 is a flow diagram illustrating an example method of activating a safety system using a change in pressure in a cavity.

FIG. 5 is a flow diagram illustrating an example method 500 of activating a safety system 140, 226, 424 in a vehicle 106, 202, 402 of the present disclosure. The method 500 shown in FIG. 5 is illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors (e.g., by one or more processors or other components of the controller 138, 218, 426 (described above)), cause the one or more processors to perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

It should be appreciated that the subject matter presented herein may be implemented as a computer process, a computer-controlled apparatus, a computing system, or an article of manufacture, such as a computer-readable storage medium. While the subject matter described with respect to the method 500 is presented in the general context of operations that may be executed on and/or with one or more computing devices, those skilled in the art will recognize that other implementations may be performed in combination with various program/controller modules. Generally, such modules include routines, programs, components, data structures, and other types of structures that perform particular tasks or implement particular abstract data types.

Those skilled in the art will also appreciate that aspects of the subject matter described with respect to the method 500 may be practiced on or in conjunction with other computer system configurations beyond those described herein, including multiprocessor systems, microprocessor-based or programmable consumer electronics, minicomputers, mainframe computers, handheld computers, mobile telephone devices, tablet computing devices, special-purposed hardware devices, network appliances, and the like.

As shown in FIG. 5, an example method 500 of activating a safety system may include, at 502, receiving information about a pressure of a cavity associated with a wheel. For example, the information may be received from pressure sensors 136, 216 measuring tire pressure and/or from sensors 414 measuring pressure of a cavity associated with a tire guard 410. In some implementations, the information received from the sensors may be pressure values, e.g., the values detected by the sensors. In other implementations, the information may be an indication that the pressure of a cavity associated with a specific sensor has exceeded a threshold pressure or has increased more than a threshold amount. For example, the sensor may include logic that outputs a warning signal if a pressure has increased by a threshold amount in a predetermined time. For example, an increase in pressure that exceeds one pound/inch$^2$ (psi) per millisecond (ms) may cause a signal to be sent to the safety system controller. In other implementations, a greater pressure change and/or a greater time may be used as discriminating factors. For example, a signal may be sent in response to a change of from about 3 pounds-per-square-inch to about 6 pounds-per-square inch in the span of about 3 ms to 7 ms. In still other embodiments, a percentage change, e.g., 10% increase in pressure, may cause generation of a warning signal indicative of a crash event, and signal may be provided to the safety system controller 138, 228, 426 for processing. As above, in some examples, signals may also be otherwise indicative of a large and sudden deformation of a tire or cavity, such as, for example, temperatures, volumes, stresses, strains, and the like of the wheel or cavity.

The method 500 may also include, at 504, receiving additional information. As detailed above, vehicles 106, 202, 402 described herein may include sensor arrays 134, environmental sensors 230, 428, and/or vehicle sensors 232, 430 disposed to sense aspects associated with and/or surrounding the vehicle. Information from any or all of these types of sensors may be received at the safety system controller 138, 228, 426. For example, the safety system controller may receive information about at least one object in the environment. This object information may include one or more of an identification of the object, a type of the object, a classification of the object, a pose of the object, a trajectory of the object, a size of the object, a speed of the object, and the like. In some embodiments, the sensors may provide one or more datasets to a computing system associated with the safety system controller 138, 228, 426, and the computing system may be configured to combine and/or synthesize the data for improved segmentation, perception, and/or planning. In some examples, the computing systems may further include simulated data that has been generated by a computer simulation algorithm, for use in part in testing. In some instances, the simulated data may include any type of simulated data, such as camera data, LIDAR data, RADAR data, SONAR data, inertial data, GPS data, etc.

As noted above, the computing system may be configured to improve segmentation, perception, and/or planning relative to objects identified in the environment. For instance, the computing system may include functionality to perform segmentation on data captured by one or more sensors of the autonomous vehicle. For example, the segmentation module 316 may input LIDAR data, camera data, RADAR data, either individually or in combination, to one or more algorithms (e.g., machine learning algorithms, region-growing algorithms, graph partitioning, and the like). For example, a segmenter may perform segmentation to segment objects represented in the data for subsequent classification, perception, and/or planning.

The computing system may also include or otherwise utilize a classifier to identify a type of object represented by the segmented data. For example, the classifier may classify one or more objects, including but not limited to cars, buildings, pedestrians, bicycles, trees, free space, occupied space, street signs, traffic lights, lane markings, etc. In some instances, the classifier may also perform classification on data to determine an occurrence of an event, such as a collision, a predicted collision, or a traffic law violation. In embodiments of this disclosure, the segmenter and/or the classifier may include any machine learning algorithms such as neural networks to perform operations of segmentation and classification, though any algorithm capable of segmenting and/or classification is contemplated.

As described herein, an exemplary neural network is a biologically inspired algorithm which passes input data through a series of connected layers to produce an output. One example of a neural network may include a convolutional neural network, or CNN. Each layer in a CNN may also comprise another CNN, or may comprise any number of layers. As may be understood in the context of this disclosure, a neural network may utilize machine learning, which may refer to a broad class of such algorithms in which an output is generated based on learned parameters.

Although discussed in the context of neural networks, any type of machine learning may be used consistent with this disclosure. For example, machine learning algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

In further aspects of this disclosure, the computing system may also include a tracker configured to receive sensor information to determine and/or distinguish between static objects and dynamic objects. In some instances, the determination of static objects or dynamic objects may be included as shared vehicle data, as discussed herein. For example, the tracker may determine a velocity of a dynamic object and/or may determine and store a trajectory of the dynamic object over time. In some instances, the tracker may include a prediction algorithm that may predict a path of the object to be tracked based on previous motion of the object.

In addition to receiving and/or calculating information about objects in the environment of the vehicle, the safety system controller may also receive information about the vehicle. This vehicle information may include one or more of a speed of the vehicle, an acceleration of the vehicle, a number of passengers in the vehicle, a size of passengers in the vehicle, the location of the passengers in the vehicle, and the like.

The method also includes, at 506, determining whether a safety system should be activated. Using the information about the cavity pressure(s) received at 502 and, in some instances, the additional information received at 504, the safety system controller 138, 228, 426 may determine that a crash is sufficiently serious that a safety system should be activated. For example, if a cavity pressure has increased by a threshold pressure, e.g., as evidenced by receiving a warning signal, as discussed above, or as determined by comparing iterative pressure values received from the sensor, the safety system controller may determine that a safety system should be activated. In some examples, as in FIGS. 3B and 3C above, the increase in pressure may also be validated as a collision with information received about an object proximate the vehicle. For example, information from imagers may suggest that another vehicle had a trajectory that would interfere with a current trajectory of the vehicle. The information may predict that the other vehicle was to impact with the vehicle at a leading, left tire. This information, coupled with a threshold increase in pressure in a cavity associated with the leading left tire, may cause the safety system controller to determine that a safety system should be deployed. Alternatively, information from the imager may determine that a piece of debris was left in the road or that a new speed bump has been installed and that the trajectory of the vehicle is such that the vehicle will contact the debris/speed bump. In this example, although the impact may cause a sudden increase in tire pressure, the safety system controller may determine that the safety system should not be activated.

In another example implementation of step 506, a speed of the vehicle may be used in determining whether a safety system should be activated. For example, consider that a spike in pressure is observed, but the vehicle is at rest or moving slowly. In some instances, impact with an object may be sufficient to cause a threshold increase in pressure in the tire or a cavity associated with a wheel, but the vehicle may be travelling sufficiently slowly that activation of the safety system may be too dramatic a response. For instance, the safety system controller 138, 228, 426 may not deploy a safety system if the impact happens at a speed of less than 30 mph, for example. Similarly, the speed of the vehicle may be used in combination with additional information, e.g., information about the object with which the vehicle collides. Similar to the example described above, a threshold increase in pressure, together with information that the vehicle has collided with another vehicle or some other relatively large object may result in a determination to activate a safety system only when the vehicle is travelling at or above a certain speed, e.g., 30 mph. In contrast, when the object with which the vehicle is to collide is smaller, e.g., a curb, the safety system controller 138, 228, 426 may determine to activate a safety system only above a different threshold speed, e.g., 50 mph.

The method 500 also includes, at 508, causing activation of a safety system. When at step 506 it is determined that the safety system should be activated, the safety system controller 138, 228, 426 may cause this activation. For example, the safety system controller 138, 228, 426 may instruct an airbag control unit to deploy one or more airbags or the safety system controller 138, 228, 426 may send a signal to a tensioner arranged to adjust tensioning of one or more restraints. Other safety systems are known and may be activated. In other embodiments, the safety system controller 138, 228, 426 may instruct activation of multiple safety systems.

Based on the foregoing, it should be appreciated that although the subject matter presented herein has been described in language specific to structural components of example vehicle systems 100, 200, 400, structural features of example controllers 138, 228, 426, methodological acts, computer readable media, and/or other structural components operably connected to the controllers, it is to be understood that the invention defined in the appended claims is not necessarily limited to the specific features, acts, or media described herein. Rather, the specific features, acts, and media are disclosed as example forms of implementing the subject matter recited in the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the examples and applications illustrated and described, and without departing from the spirit and scope of the present invention, which is set forth in the following claims.

What is claimed is:

1. A method of activating a safety system in a vehicle, the vehicle comprising at least one component having an internal cavity and a sensor for sensing a pressure of the internal cavity, the method comprising:
   receiving information indicative of an increase in pressure in the interval cavity, the increase in pressure resulting from a vehicle contacting an object;
   receiving perception information;
   determining, from the perception information, one or more attributes of the object; and
   determining, based at least in part on the one or more attributes of the object and the information, whether to activate the safety system.

2. The method of claim 1, further comprising:
    determining from the one or more attributes, that the object comprises one or more of a curb or a pothole; and
    refraining, based at least in part on the object comprising one or more of the curb or the pothole, from activating the safety system.

3. The method of claim 1, further comprising:
    receiving velocity information corresponding to a velocity of the vehicle; and
    determining a threshold pressure based at least in part on the velocity information;
    wherein determining whether to activate the safety system is further based at least in part on whether the increase in pressure meets or exceeds the threshold pressure.

4. The method of claim 1, further comprising receiving prediction information indicative of a collision or an imminent collision of the vehicle with the object.

5. A vehicle comprising:
    a body;
    a plurality of tires coupled to the body and configured to transport the body along a surface, individual of the plurality of tires being disposed at a distance from a lateral axis of the body in a longitudinal direction;
    a cavity associated with a first tire of the plurality of tires;
    a first sensor disposed to sense a pressure in the cavity;
    a second sensor disposed to determine a velocity of the vehicle;
    a safety system associated with the body; and
    a safety system controller communicatively coupled to the first sensor, the second sensor, and the safety system, the safety system controller configured to:
        determine, based at least in part on the velocity, a threshold pressure increase indicative of a crash event;
        determine, based on the pressure in the cavity increasing by at least the threshold pressure increase, a crash event; and
        control the safety system based on the determining the crash event.

6. The vehicle of claim 5, wherein the cavity is an internal cavity of the first tire.

7. The vehicle of claim 5, further comprising a tire guard attached to the body and disposed proximate at least a portion of the first tire, wherein the cavity is an internal cavity of the tire guard and the cavity is disposed, in the longitudinal direction, beyond a front of the tire.

8. The vehicle of claim 7, wherein the sensor is disposed in the cavity and the sensor is physically connected to the safety system controller.

9. The vehicle of claim 5, wherein the threshold pressure increase includes at least one of a threshold change in pressure in the cavity, a threshold pressure value in the cavity, a threshold rate of increase of the pressure in the cavity, or a threshold quantity of the increase.

10. The vehicle of claim 5, further comprising an environmental sensor,
    wherein the safety system controller is further configured to receive, from the environmental sensor, environmental information indicative of one or more environmental attributes of an environment of the vehicle, and
    wherein the controlling the safety system is based at least in part in response to the one or more environmental attributes.

11. The vehicle of claim 10, wherein the one or more environmental attributes comprise information indicative of an object in the environment contacted by the vehicle.

12. The vehicle of claim 5, wherein the safety system controller is further configured to receive vehicle information indicative of one or more vehicular attributes of the vehicle, and wherein the controlling the safety system is based at least in part in response to the one or more vehicular attributes.

13. The vehicle of claim 12, wherein the one or more vehicular attributes comprise at least one of a speed of the vehicle relative to an object or an acceleration of the vehicle.

14. The vehicle of claim 5 wherein the safety system controller is further configured to receive at least one of environmental information indicative of one or more environmental attributes of an environment of the vehicle or vehicle information indicative of one or more vehicular attributes of the vehicle, and to determine to refrain from activating the safety system based at least in part on the at least one of the vehicle information or the environmental information.

15. A vehicle comprising:
    a body having a leading surface and a trailing surface, the leading surface and the trailing surface being separated by a first distance in a longitudinal direction;
    a leading tire, at least a portion of the leading tire disposed, in the longitudinal direction, a second distance from the trailing surface, the second distance being greater than the first distance of the leading surface from the trailing surface;
    a pressure sensor disposed to sense a pressure associated with the leading tire;
    a safety system; and
    a safety system controller communicatively coupled to the pressure sensor and the safety system, the safety system controller being configured to:
        receive information from the pressure sensor indicative of an increase in pressure resulting from contact with an object;
        determine, from perception information, one or more attributes of the object;
        determine, based at least in part on the one or more attributes and the perception information, whether to activate the safety system.

16. The vehicle of claim 15, further comprising a vehicular sensor configured to sense at least one of a speed of the vehicle or an acceleration of the vehicle, wherein the vehicular sensor is communicatively coupled to the safety system controller and the safety system controller is further configured to control the safety system at least in part based on the at least one of the speed or the acceleration of the vehicle.

17. The vehicle of claim 15, further comprising an environmental sensor disposed on the body and configured to sense one or more attributes of an environment of the vehicle, wherein the environmental sensor is communicatively coupled to the safety system controller and the safety system controller is further configured to control the safety system based at least in part based on the one or more attributes of the environment, the one or more attributes of the environment comprising at least one of a location or an identification of the object in the environment.

18. The vehicle of claim 15, wherein the pressure sensor is a first pressure sensor and the pressure is a first pressure, the vehicle further comprising:
    a trailing tire, at least a portion of the trailing tire disposed, in the longitudinal direction, a distance from the leading surface further than the trailing surface; and a second pressure sensor disposed to sense a second pressure associated with the, wherein the second pressure sensor is communicatively coupled the safety system controller.

19. The vehicle of claim 15, wherein the pressure sensor is a tire pressure sensor and the pressure is a tire pressure of the leading tire.

20. The vehicle of claim 15, further comprising a tire guard associated with the leading tire, the tire guard defining an internal cavity and the pressure sensor being disposed to sense the pressure of the internal cavity.

\* \* \* \* \*